(12) United States Patent
Lin et al.

(10) Patent No.: US 6,920,442 B2
(45) Date of Patent: Jul. 19, 2005

(54) METHOD FOR CONTROLLING OPERATION OF AN ELECTRIC FAN

(76) Inventors: Kun-Feng Lin, 7F, No. 35, Lane 268, Fu-Teh Road, Taipei (TW); Tai-Chieh Chiu, 13F-1, No. 626, Kwang-Fu South Rd., Taipei (TW)

(*) Notice: Subject to any disclaimer, the term of this patent is extended or adjusted under 35 U.S.C. 154(b) by 663 days.

(21) Appl. No.: 10/103,958

(22) Filed: Mar. 22, 2002

(65) Prior Publication Data

US 2003/0182024 A1 Sep. 25, 2003

(51) Int. Cl.$^7$ ................................................ G06N 5/00
(52) U.S. Cl. .................................... 706/45; 700/34
(58) Field of Search ........................ 706/45; 62/380; 700/34; 702/132; 713/320

(56) References Cited

U.S. PATENT DOCUMENTS

| | | | | |
|---|---|---|---|---|
| 4,495,560 A | * | 1/1985 | Sugimoto et al. | 700/34 |
| 5,513,361 A | * | 4/1996 | Young | 713/320 |
| 6,463,396 B1 | * | 10/2002 | Nishigaki | 702/132 |
| 6,796,142 B2 | * | 9/2004 | Burn | 62/380 |

* cited by examiner

Primary Examiner—Wilbert L. Starks, Jr.
(74) Attorney, Agent, or Firm—Ladas & Parry (57) ABSTRACT

The present invention relates to a method for controlling the operation of an electric fan. The primary objective of the present invention is to automatically adjust the requirement of the blowing of the fan in sleeping time at night. Therefore, in a sleeping status at night, the invented electric fan is designed by that a small operating cycle of the fan is gradually changed from blowing for a long period of time and stopping operating for a short period of time to blowing for a shortened short period of time and stopping operating for a lengthened period of time, operating for a fixed period of time prior to stopping operating for a changeable period of time which extends by the extension of the sleeping time, or operating for a long period of time which shortens due to the extension of the sleeping time prior to stopping operating for a fixed period of time. In this way, the automatic adjustment can reduce the requirement of the blowing of the fan, so the sleeping user will not catch cold so easily as caused by the conventional electric fans. The present invention controls the operation of the electric fans by embedding software in a microprocessor or by using an application specific integrated circuit.

27 Claims, 8 Drawing Sheets

METHOD FOR CONTROLLING OPERATION OF AN ELECTRIC FAN

BACKGROUND OF THE INVENTION

Figure 1:
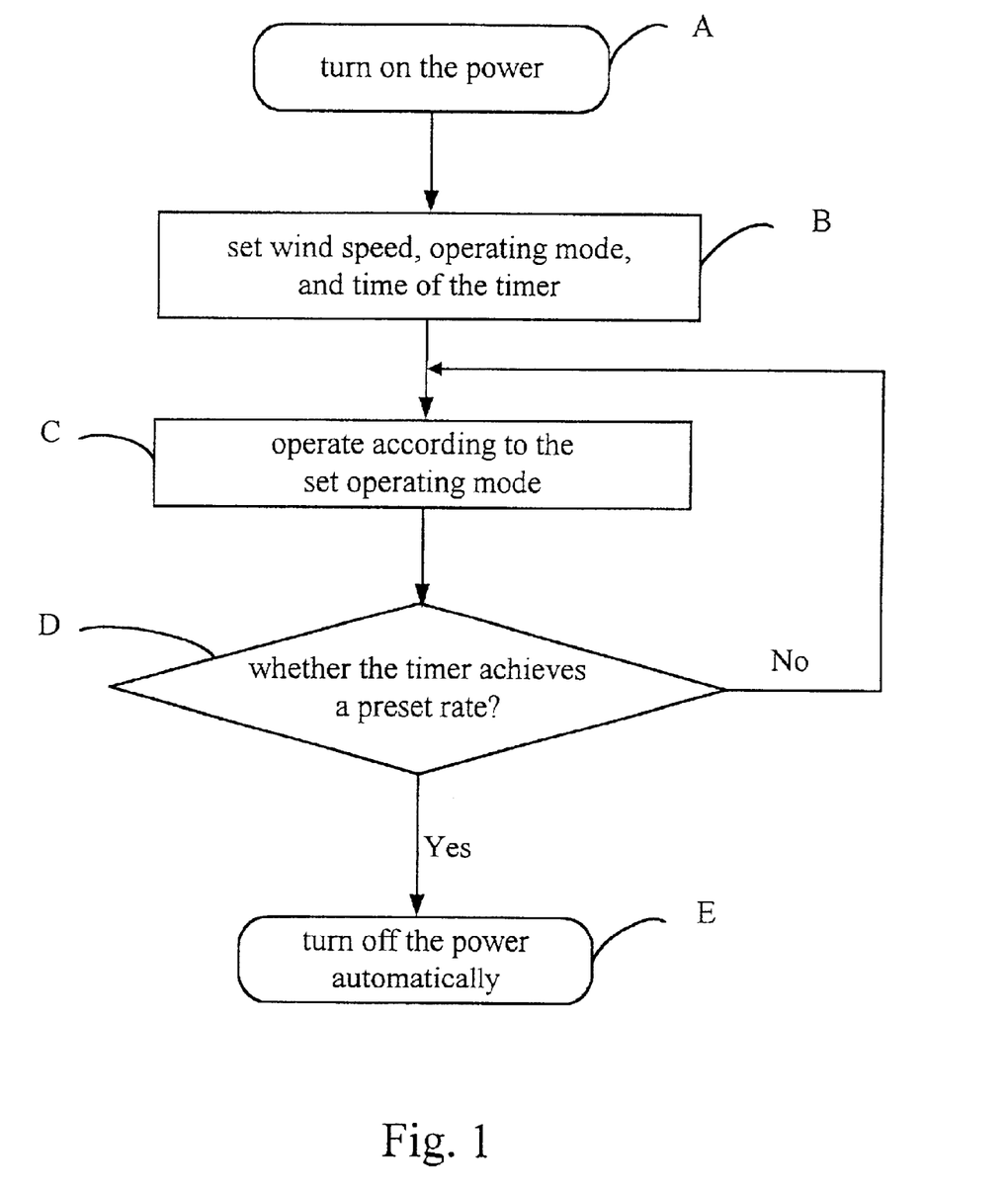
FIG. 1 is a flow chart of the control method in a prior art electric fan with a timer.

The present invention relates to a method for controlling the operation of an electric fan by a timer. In a prior art method, as shown in the flow chart in FIG. 1, when a fan is activated (step A), its wind speed (high, medium, or low), operating mode (natural wind or steady wind), and timer (1, 2, 4, 6, or 8 hours) will be set (step B). In step C, the fan will operate steadily or adjustably according to the above setup combination. When the fan is set to operate for the period of time by the timer (step D), the fan will stop operating and shut off accordingly (step E); otherwise, the fan is operating continuously according to the setup combination.

The operating modes of the prior art fan include operating steadily (blowing continuously at a regular speed) and operating adjustably (blowing at a changing speed and for a regular period of time). No matter which method is adopted, at night, as the room temperature goes down gradually, the user sleeping for a certain period of time will no longer need the blowing of the fan at a regular speed. If the blowing method of the fan of the prior art is still adopted, the requirement of reducing the speed of fan blowing while people in sleep as the room temperature goes down at night, will not be meet, and the user is easily to catch cold.

Therefore, to remedy the above drawbacks is the primary objective of the present invention.

SUMMARY OF THE INVENTION

The primary objective of the present invention is to ensure the user to have a sound sleep under the comfortable, natural wind sent out by the invented fan, without catching cold as the room temperature goes down gradually at night. For operating in a sleeping mode at night, the small timers of the fan are used to control the time of blowing and the time of stopping blowing, respectively. The base timer (big cycle) of the fan is composed of a plurality of identical, small cycles. Small cycles in different periods of time (big cycle) will change by the lengthening of sleeping time. (Each period of time (big cycle) of the fan is also composed of a plurality of identical small cycles). First, the small cycle of the fan will start the blowing for a long period of time and stop the blowing for a short period of time. As the time of sleeping gets longer, the blowing time will shorten gradually so that the time of stopping the blowing lengthens gradually. The small cycle of the fan is controlling of the fixed time of blowing and stopping the changable time of blowing. As the time of sleeping lengthens, the fixed time of blowing remains unchanged, and the changable time of stopping the blowing will lengthen gradually. Or, the small cycle of the fan is to control the changable time of blowing and to stop the fixed time of blowing. As the time of sleeping lengthens, the time of blowing will shorten gradually, and the time of stopping the blowing remains unchanged. So that the sleeping user won't catch cold so easily while using a conventional electric fan. The present invention controls the operation of the electric fans by writing software in a microprocessor or utilizing specific integrated circuit. Therefore, the present invention is very valuable.

To understand the effect of the content of the present invention, a preferred embodiment is enumerated by the accompanying drawings described in detail as follows:

SYMBOLS OF MAJOR PARTS

A . . . turn on the power

B . . . set speed, operating mode, and time of operation

C . . . operate according to the set operating mode

D . . . determine whether the timer will achieve the preset goal

E . . . turn off the power automatically

10 . . . turn on the power

11 . . . change system setup rate

12 . . . whether in the sleeping mode

13 . . . operate in regular mode for the first period of time preset

14 . . . whether to finish the next period of time preset

15 . . . set an initial goal and small operating cycle formula

16 . . . execute a small cycle according to small operating cycle formula

17 . . . whether to finish the next period of time (big cycle)

18 . . . determine whether to achieve shut down preset rate of the timer

19 . . . turn off the power automatically

DETAILED DESCRIPTION OF THE PREFERRED EMBODIMENT

Figure 2:
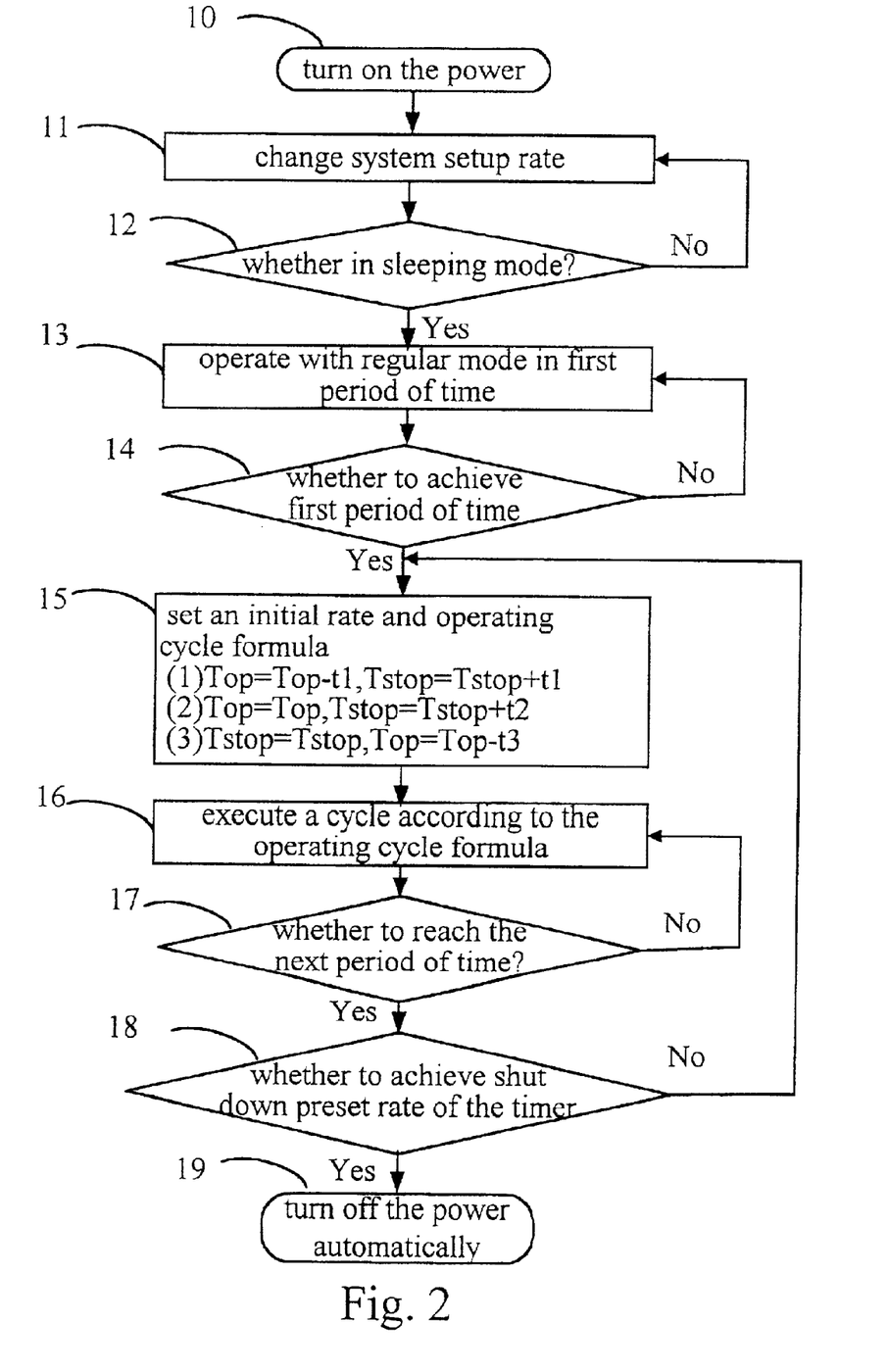
FIG. 2 is a flow chart of a preferred embodiment of the present invention.

As shown in FIG. 2, the present invention relates to a method for controlling the operation of an electric fan in the sleeping mode. The control flow chart of the electric fan in the sleeping mode is described as follows. When the electric fan is turned on (step 10), it has the blowing speed set at low, the timer set at zero, and the operating mode set at regular. After that, a user press the keys of the electric fan to change the system setup goal (step 11) which comprises: 1. setting the speed key to low, medium, or high; 2. setting the time key to 1, 2, 4, 6, or 8 hours; 3. setting the mode key to natural, regular, or sleeping.

Figure 3A:
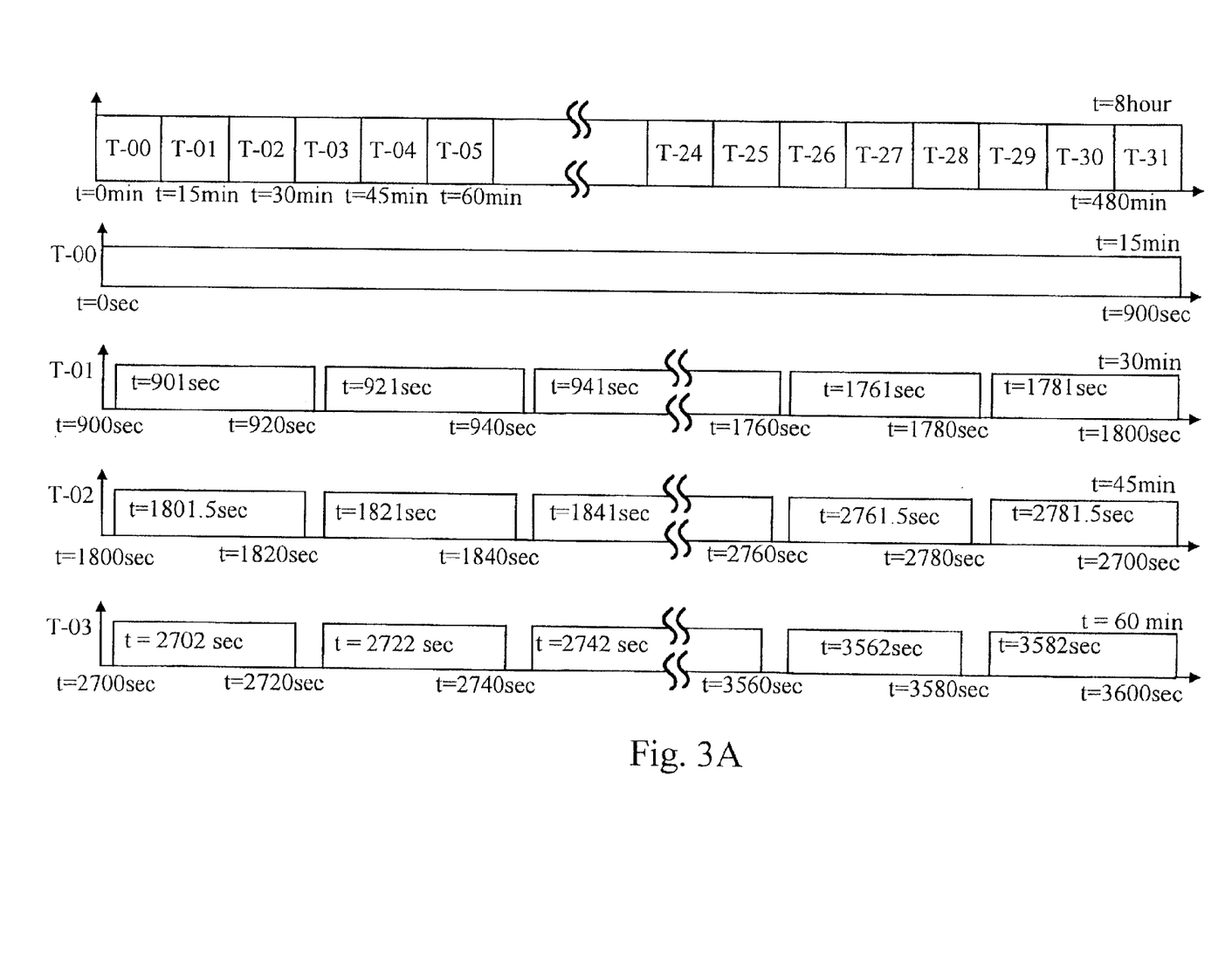
FIGS. 3A and 3B are timing diagrams of a first preferred embodiment of the present invention.
Figure 3B:
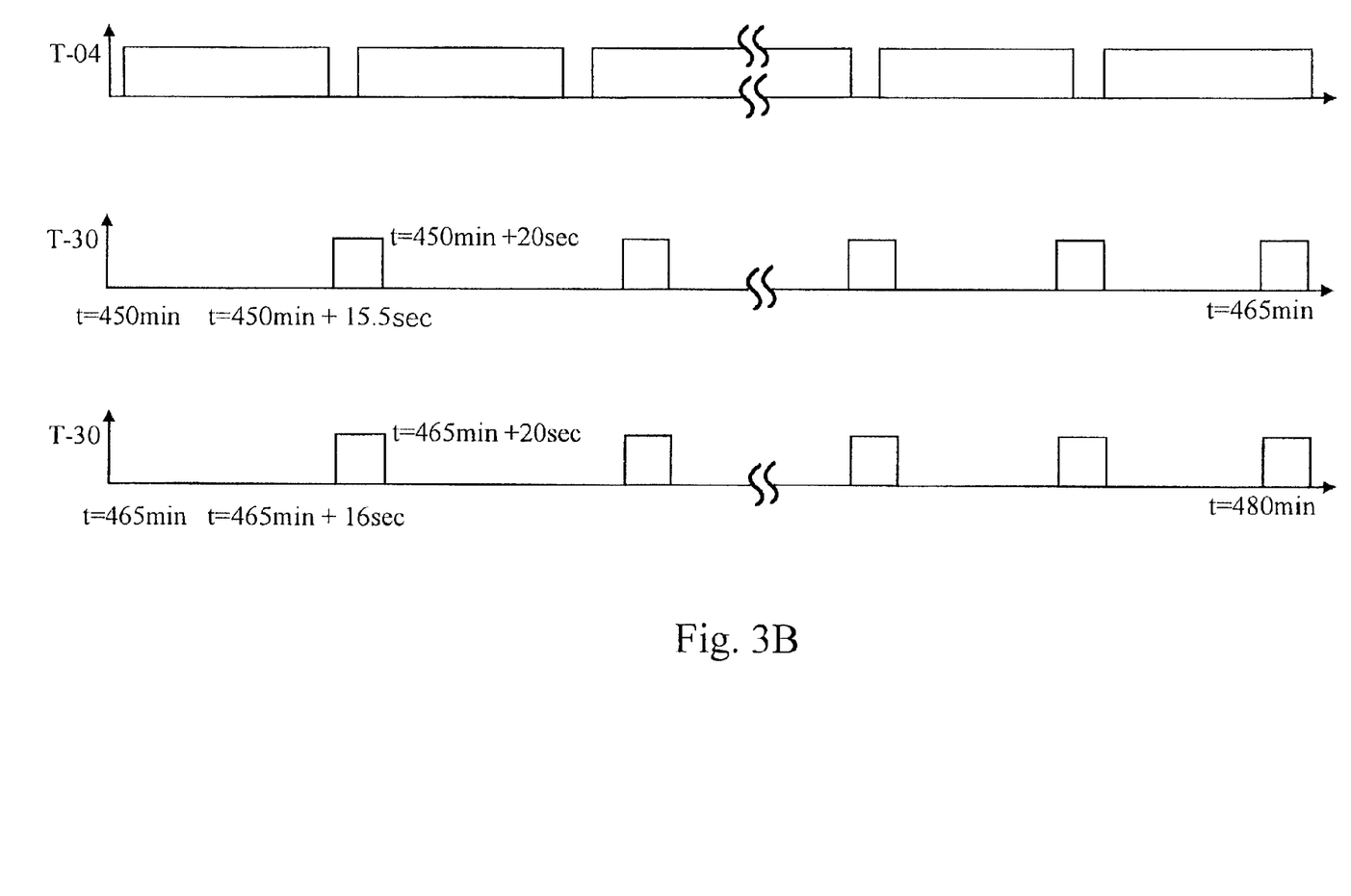

When the electric fan is set in the sleeping mode, several periods of time (such as 15 mm.) can be set. The first period of time will start to tick when a user desires to go to sleep (i.e. intending to sleep but not falling asleep). Besides, the electric fan blows according to the regular mode (step 13) for the first period of time (such as 15 min.) In FIG. 3A, FIG. 3B, FIG. 4A, FIG. 4B, FIG. 5A, and FIG. 5B, T-00 period of ASIC (Application Specific Integrated Circuit) indicates the first period of time. After determining whether to finish the first period of time (step 14), the electric fan will change the control of blowing in sleeping mode automatically. In this mode, the electric fan can control the blowing according to the timer which is set by the user and one of the three formulas in step 15. The formulas comprise the above mentioned three formulas to control the blowing automatically. The controlling methods of the three formulas are described as follows:

The controlling method of the first formula is shown in FIG. 2, FIG. 3A and FIG. 3B. At the beginning (i.e. t=15 min) of a second period (i.e. T01 period of t=15~30 min in FIG. 3A), set an initial blowing time of the electric fan to 19.5 sec (Top=19.5 sec), an initial stopping operating time to 0.5 sec (Tstop=0.5 sec), and increasing the time to 0.5 sec (t1=0.5 sec).

Next, the initial rates are incorporated into the first formula of the small operating cycle to calculate: Top=Top−t1, Tstop=Tstop+t1. Therefore, the ideal rate of each small cycle in operating is changed to the stopping operating period Tstop=0.5+0.5=1 sec, and the blowing period Top=19.55−0.5=19 sec. The electric fan then executes a small cycle repeatedly according to the rate (step 16). In step 17, check each small cycle whether to start the beginning (i.e. t=30 min) of next (third) period (i.e. T-02 of t=30~45 min). If not, repeatedly execute a small cycle h; if starting the beginning of next period, then determine whether j achieves the shut down rate of the timer (step 18). If yes, then turn off the power of the electric fan automatically (step 19); if not achieving the shut down rate, then the blowing cycle value of the electric fan is calculated according to the first formula again (step 15): Tstop=Tstop+t1 and Top=Top−t1. Therefore, the ideal rate of each small cycle in operating is changed to the stopping operating period Tstop=1+0.5=1.5 sec, and the blowing period Top=19−0.5=18.5 sec. The electric fan then executes a small cycle repeatedly according to the rate again (step 16). In step 17, check each small cycle whether to start the beginning (i.e. t=45 min) of next period. If not, repeatedly execute a small cycle (step 16); if starting the beginning of next period, then determine whether to achieve the shut down rate of the timer (step 18). If yes, then turn off the power of the electric fan automatically (step 19); if not achieving the shut down rate, then the blowing cycle rate of the electric fan is calculated according to the first formula again: Tstop=Tstop+t1 and Top=Top−t1. The fan executes repeatedly according to the above principle. When the fan repeats the above periods of time, it shortens the blowing period Top and lengthens the stopping operating period Tstop according to t1=0.5 sec. Such, the human beings reducing the requirement of blowing of the fan is considered. If the shut down rate of the timer is set to 8 hours as shown in FIG. 3A, then a $32^{nd}$ period (T-31) is the last period, the stopping period extends to 16 sec, and the blowing period reduces to 4 sec. In the above sleeping mode, no matter what is the shut down rate of the timer, when the fan achieves it, the power of the fan will be tuned off automatically. The control of the fan can be accomplished with application specific integrated circuit (ASIC), and the timing is shown in FIG. 3A and FIG. 3B.

For the above first formula, the small operating cycle consisting a long period of time blowing and a short period of time of stopping operating is changed to a shorter period of time of blowing and a longer period of time of stopping operating by the lengthening of sleeping time at night. This way, the automatic adjustment of the requirement of the blowing of the fan, will keep the user from catching cold so easily in sleeping at night.

Figure 4A:
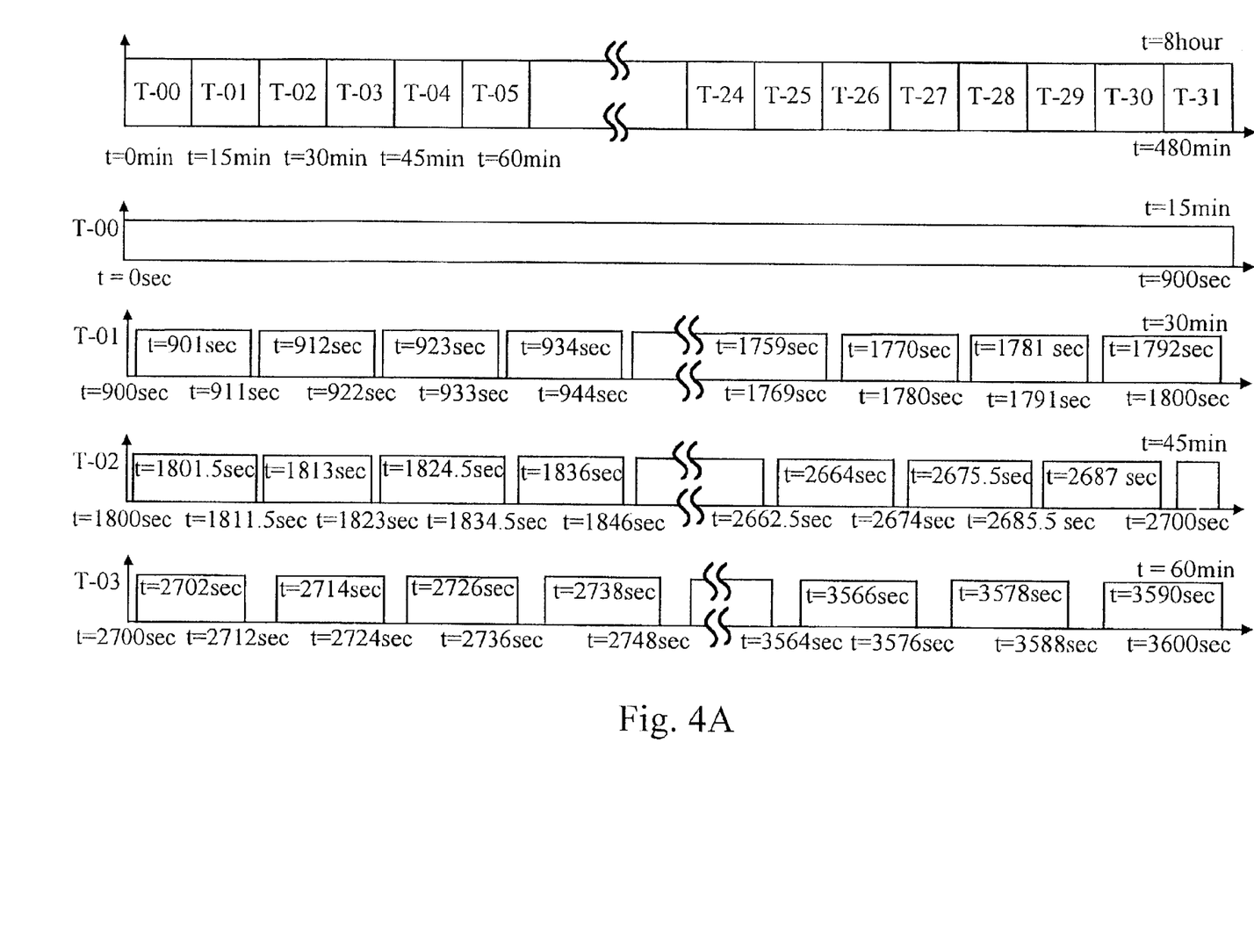
FIGS. 4A and 4B are timing diagrams of a second preferred embodiment of the present invention.
Figure 4B:
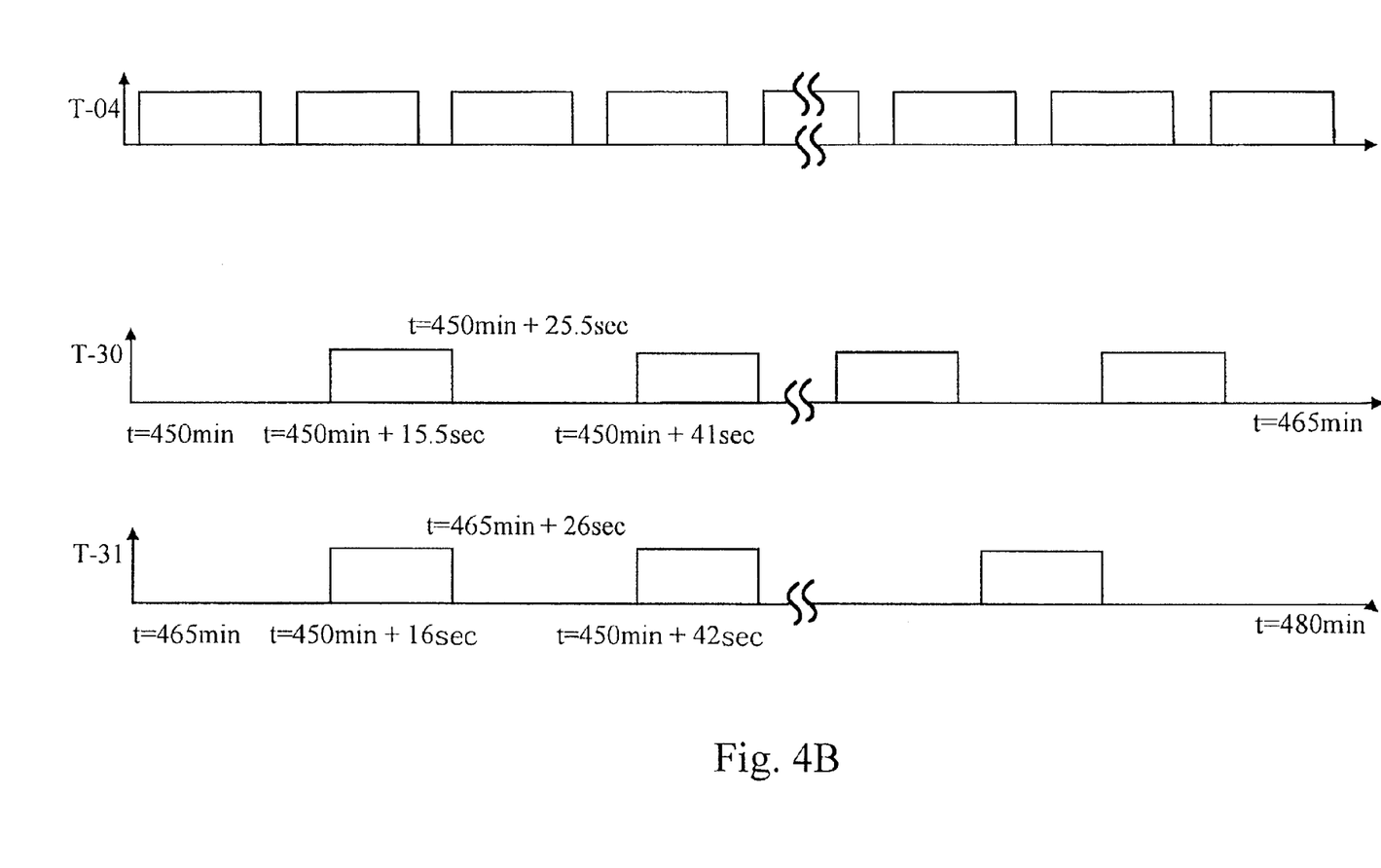

The controlling method of the second formula is shown in FIG. 2, FIG. 4A, and FIG. 4B. The stopping operating period Tstop of the small operating cycle is changeable, and the blowing period Top is fixed (such as Top=10 sec). Then the initial rate of the stopping operating period Tstop and increasing time t2 (i.e. Tstop=0.5 sec, and t2=0.5 sec) are incorporated into the second formula in step 15 to calculate: Top=Top (fixed), Tstop=Tstop+t2. Therefore, as shown in the second period T-01 in FIG. 4A, the fan will stop 0.5+0.5=1 sec prior to blow 10 sec ideally. This way, operating the small cycle, check whether to start the beginning (i.e. t=30 min) of next (third) period (i.e. T-02 of t=30~45 min in FIG. 4A) when each small cycle ends. If not, repeatedly execute a small cycle; if starting the beginning of next period, then determine whether to achieve the shut down rate of the timer. If yes, the power of the electric fan will be turned off automatically; if not achieving the shut down rate, then the blowing cycle rate of the electric fan is calculated according to the second formula again: Top=Top (fixed) and Tstop=Tstop+t2. In the third period T-02, the fan stops 1+0.5=1.5 sec prior to blowing 10 sec ideally. Such, the fan operates repeatedly according to the above principle. When the fan repeats the above periods of time, it lengthens the stopping operating period Tstop according to t2=0.5 sec but remains the blowing period Top, so the stopping operating period Tstop is lengthened to Tstop=Tstop+t2. Therefore, after several periods of time, the stopping operating period Tstop lengthens by the extension of the sleeping time. Such, the automatic adjustment of the requirement of the blowing of the fan is achieved. If the shut down rate of the timer is set to 8 hours as shown in FIG. 4B, then a $32^{nd}$ period (T-31) is the last period. At this time, the stopping time of the small cycle extends to 16 sec, and the time of blowing remains 10 sec. In the above sleeping mode, no matter what is the shut down rate of the timer, when the fan achieves it, the power of the fan will be tuned off automatically. The control of the fan can be accomplished with application specific integrated circuit (ASIC), and the timing is shown in FIG. 4A and FIG. 4B.

For the above second formula, the small operating cycle controlling a fixed period of time of blowing and a short period of time of stopping operating is changed to an unchanged period of time of blowing and an extended period of time of stopping operating by the extension of sleeping time at night. This way, the automatic adjustment of the requirement of the blowing of the fan is achieved.

Figure 5A:
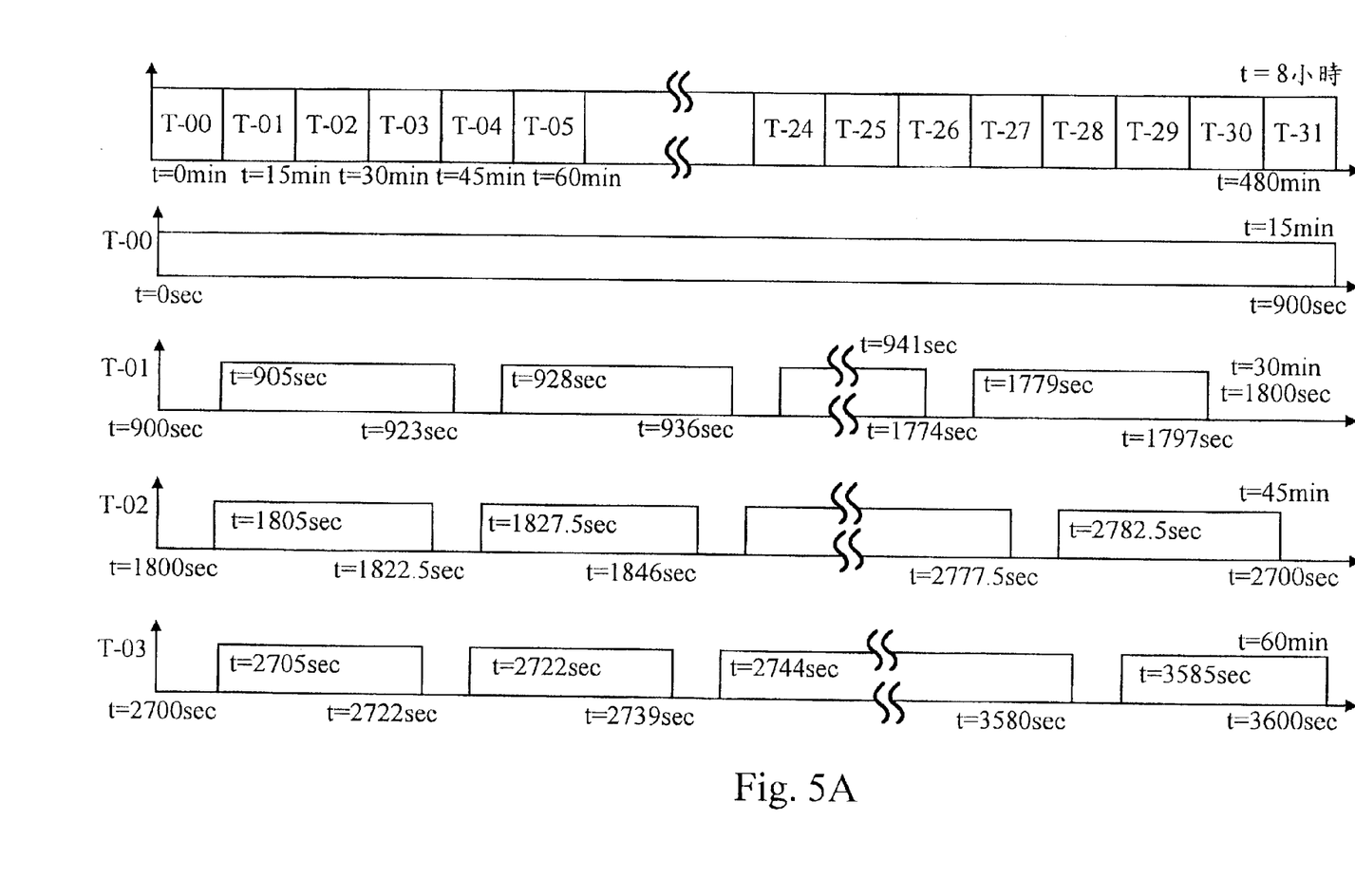
FIGS. 5A and 5B are timing diagrams of a third preferred embodiment of the present invention.
Figure 5B:
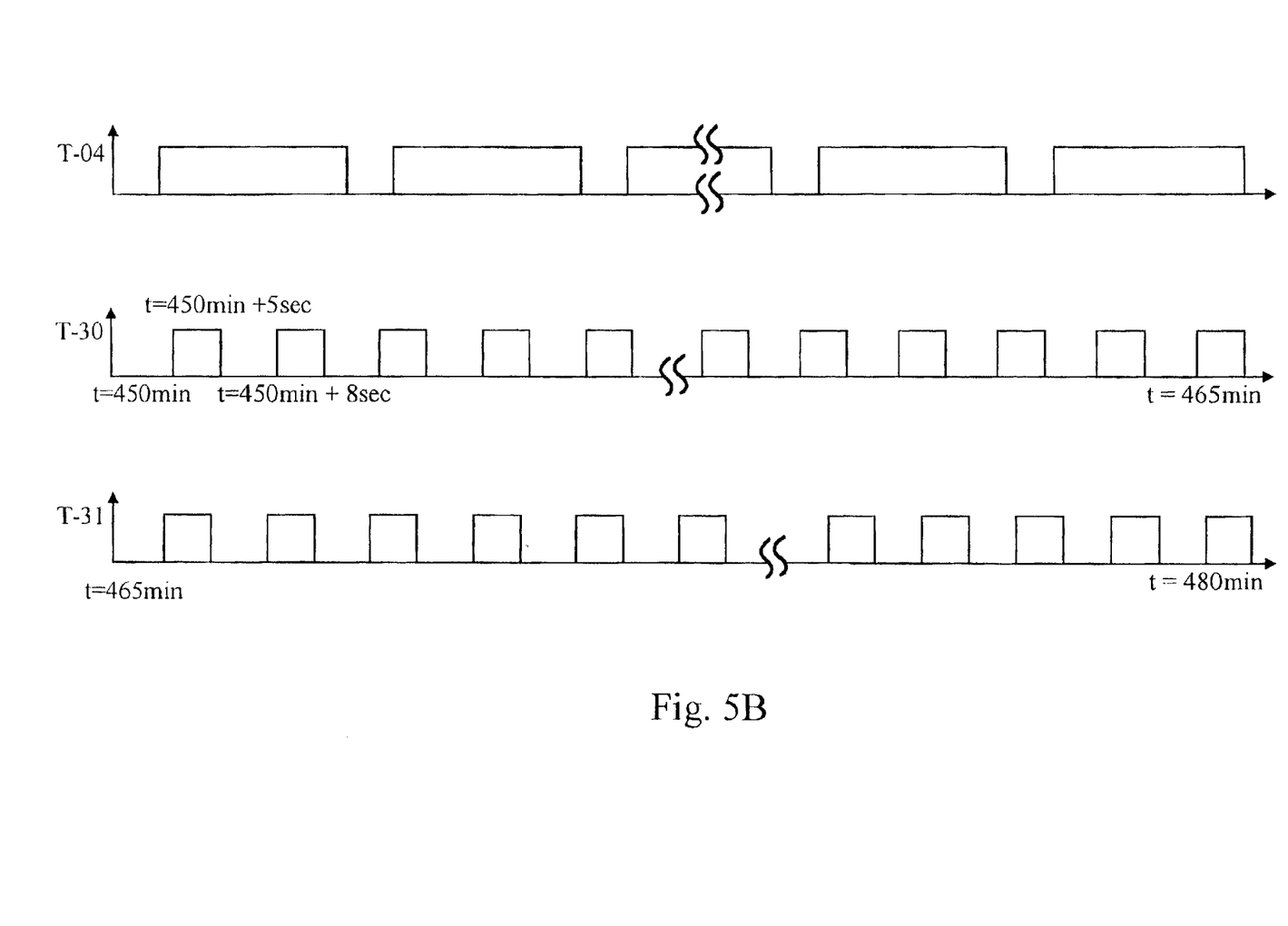

The third method is shown in FIG. 2, FIG. 5A and FIG. 5B. The stopping operating period Tstop of the small operating cycle is fixed (such as Tstop=5 sec), and the blowing period Top is shortened according to a formula Top=Top−t3. Then the initial rate of the blowing period Top and shortening time t3 (i.e. Top=18.5 sec, and t3=0.5 sec) are incorporated into the third formula to calculate: Tstop=Tstop (fixed), Top=Top−t3. Therefore, as shown in the second period T-01 in FIG. 5A, the fan will stop 0.5 sec prior to blowing 18.5−0.5=18 sec ideally. Such repeating, check whether to start the beginning (i.e. t=30 min) of next (third) period (i.e. T-02 of t=30~45 min in FIG. 5A) when each small cycle ends. If not, repeatedly execute a small cycle; if starting the beginning of next period, then determine whether to achieve the shut down rate of the timer. If yes, the power of the electric fan will be turned off automatically k; if not achieving the shut down rate, then the blowing cycle rate of the electric fan is calculated according to the third formula again: Tstop=Tstop (fixed) and Top=Top−t3. In the third period T-02, the fan stops 5 sec prior to blowing 18−0.5=17.5 sec ideally. Such, the fan operates repeatedly according to the above principle. When the fan repeats the above periods of time, it shortens the blowing period Top according to t3=0.5 sec but remains the stopping operating Tstop. Therefore, after several periods of time, the blowing period shortens by the extension of the sleeping time. Such, the automatic adjustment of the requirement of the blowing of the fan is achieved. If the shut down rate of the timer is set to 8 hours as shown in FIG. 5A, then a $32^{nd}$ period (T-31) is the last period. At this time, the stopping period is still 5 sec, and the blowing period shortens to 3 sec. In the above sleeping mode, no matter what is the shut down rate of the timer, when the fan achieves it, the power of the fan will be tuned off automatically. The control of the fan can be accomplished with application specific integrated circuit (ASIC), and the timing is shown in FIG. 5A and FIG. 5B.

For the above third formula, the small operating cycle controlling a long period of time of blowing and a fixed period of time of stopping operating is gradually changed to an unchanged period of time of stopping operating and a shortened period of time of blowing by the extension of sleeping time at night. This way, the automatic adjustment of the requirement of the blowing of the fan is achieved.

The three principles of the present invention keep the conventional fan from blowing continuously from night to dawn at the lower room temperature through lengthening the stopping operating period, shortening the blowing period, or shortening the blowing period and lengthening the stopping operating period at the same time. Therefore, it has industrial practicability.

To reveal the advantages and practicability of the present invention, the analysis in correction with the prior art is listed as follows:

Disadvantages of the Prior Art:

1. The regular, natural, or sleeping modes all dissipate heat greatly at dawn and make people catch cold easily.

2. The regular, natural, or sleeping modes can't be controlled automatically by the lengthening of sleeping so that people catch cold easily.

Advantages of the Present Invention:

1. The principle of shortening the blowing time at the extension of sleeping can reduce the dissipating heat greatly at dawn, or the automatic adjustment at the extension of sleeping can keep the sleeping user from catching cold.

2. The principle of extending the stopping operating period by extension of sleeping can reduce dissipating heat greatly at dawn, or the automatic adjustment or the extension of sleeping can keep the sleeping user from catching cold.

3. Or, utilization of both principles can reduce the dissipating heat greatly at dawn, or the automatic adjustment at the extension of sleeping can keep the sleeping user from catching cold.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for controlling the operation of an electric fan comprising:

initializing a status of the electric fan;

operating keys of the electric fan to change a system setup rate by a user; and setting an operating mode of the electric fan to a sleeping mode including:

using a predetermined period of time to be a preset period;

using another predetermined period of time to be a big cycle time;

setting a blowing period and a stopping period to be a small cycle time;

making the electric fan blow and stop blowing according to the blowing period and the stopping period, respectively, and continuing blowing and stopping blowing of the small cycle time repeatedly in the period of the big cycle time;

determining whether to achieve a timer setup when the period of the big cycle time ends;

if not, changing the blowing period and the stopping blowing period of the small cycle time, shortening the blowing period and lengthening the stopping blowing period, making the electric fan blow and stop blowing according to the shortened blowing period and the lengthened stopping blowing period, respectively, and restarting another big cycle time; and if yes, stopping the electric fan.

2. The method of claim 1 wherein the step of initializing a status of the electric fan comprises:

presetting a speed to low;

zeroing the timer; and presetting the operating mode to regular.

3. The method of claim 1 wherein the system setup rate comprises:

a speed setup;

a timer setup; and an operating mode setup.

4. The method of claim 3 wherein the speed setup comprises:

low;

medium; and high.

5. The method of claim 3 wherein the timer setup comprises:

one hour;

two hours;

four hours;

six hours; and eight hours.

6. The method of claim 3 wherein the operating mode setup comprises:

a natural mode;

a regular mode; and a sleeping mode.

7. The method of claim 1 wherein the electric fan operates in the regular mode in the preset period.

8. The method of claim 1 wherein the blowing period and the stopping period can be setup in manufacturing.

9. The method of claim 1 wherein the small cycle time controls the blowing period and the stopping period.

10. A method for controlling the operation of an electric fan comprising:

initializing a status of the electric fan;

operating keys of the electric fan to change a system setup rate by a user; and setting an operating mode of the electric fan to a sleeping mode including:

using a predetermined period of time to be a preset period;

using another predetermined period of time to be a big cycle time;

setting a blowing period and a stopping period to be a small cycle time;

making the electric fan blow and stop blowing according to the blowing period and the stopping period, respectively, and continuing blowing and stopping blowing of the small cycle time repeatedly in the period of the big cycle time;

determining whether to achieve a timer setup when the period of the big cycle time ends;

if not, changing the stopping blowing period of the small cycle time, remaining the blowing period, lengthening the stopping blowing period, making the electric fan blow and stop blowing according to the shortened blowing period and the lengthened stopping period, respectively, and restarting another big cycle time; and if yes, stopping the electric fan.

11. The method of claim 10 wherein the step of initializing a status of the electric fan comprises:

presetting a speed to low;

zeroing the timer; and presetting the operating mode to regular.

12. The method of claim 10 wherein the system setup rate comprises:

a speed setup;

a timer setup; and an operating mode setup.

13. The method of claim 12 wherein the speed setup comprises:

low;

medium; and high.

14. The method of claim 12 wherein the timer setup comprises:

one hour;

two hours;

four hours;

six hours; and eight hours.

15. The method of claim 12 wherein the operating mode setup comprises:

a natural mode;

a regular mode; and a sleeping mode.

16. The method of claim 10 wherein the electric fan operates in the regular mode in the preset period.

17. The method of claim 10 wherein the blowing period and the stopping period can be setup in manufacturing.

18. The method of claim 10 wherein the small cycle time controls the blowing period and the stopping period.

19. A method for controlling the operation of an electric fan in a sleeping status comprising:

initializing a status of the electric fan;

operating keys of the electric fan to change a system setup rate by a user; and set an operating mode of the electric fan to a sleeping mode including:

using a predetermined period of time to be a preset period;

using another predetermined period of time to be a big cycle time;

setting a blowing period and a stopping period to be a small cycle time;

making the electric fan blow and stop blowing according to the blowing period and the stopping period, respectively, and continuing blowing and stopping blowing of the small cycle time repeatedly in the period of the big cycle time;

determining whether to achieve a timer setup when the period of the big cycle time ends;

if not, changing the blowing period of the small cycle time, remaining the stopping period, shortening the blowing period, making the electric fan blow and stop blowing according to the shortened blowing period and the lengthened stopping period, respectively, and restarting another big cycle time; and if yes, stopping the electric fan.

20. The method of claim 19 wherein the step of initializing a status of the electric fan comprises:

presetting a speed to low;

zeroing the timer; and presetting the operating mode to regular.

21. The method of claim 19 wherein the system setup rate comprises:

a speed setup;

a timer setup; and an operating mode setup.

22. The method of claim 21 wherein the speed setup comprises:

low;

medium; and high.

23. The method of claim 21 wherein the timer setup comprises:

low;

two hours;

four hours;

six hours; and eight hours.

24. The method of claim 21 wherein the operating mode setup comprises:

a natural mode;

a regular mode; and a sleeping mode.

25. The method of claim 19 wherein the electric fan operates in the regular mode in the preset period.

26. The method of claim 19 wherein the blowing period and the stopping period can be setup in manufacturing.

27. The method of claim 19 wherein the small cycle time controls the blowing period and the stopping period.

* * * * *